INVENTORS
PAUL E. APPLEBY
DENVER C. FOLDEN
DONALD C. KUBINSKI

AGENT

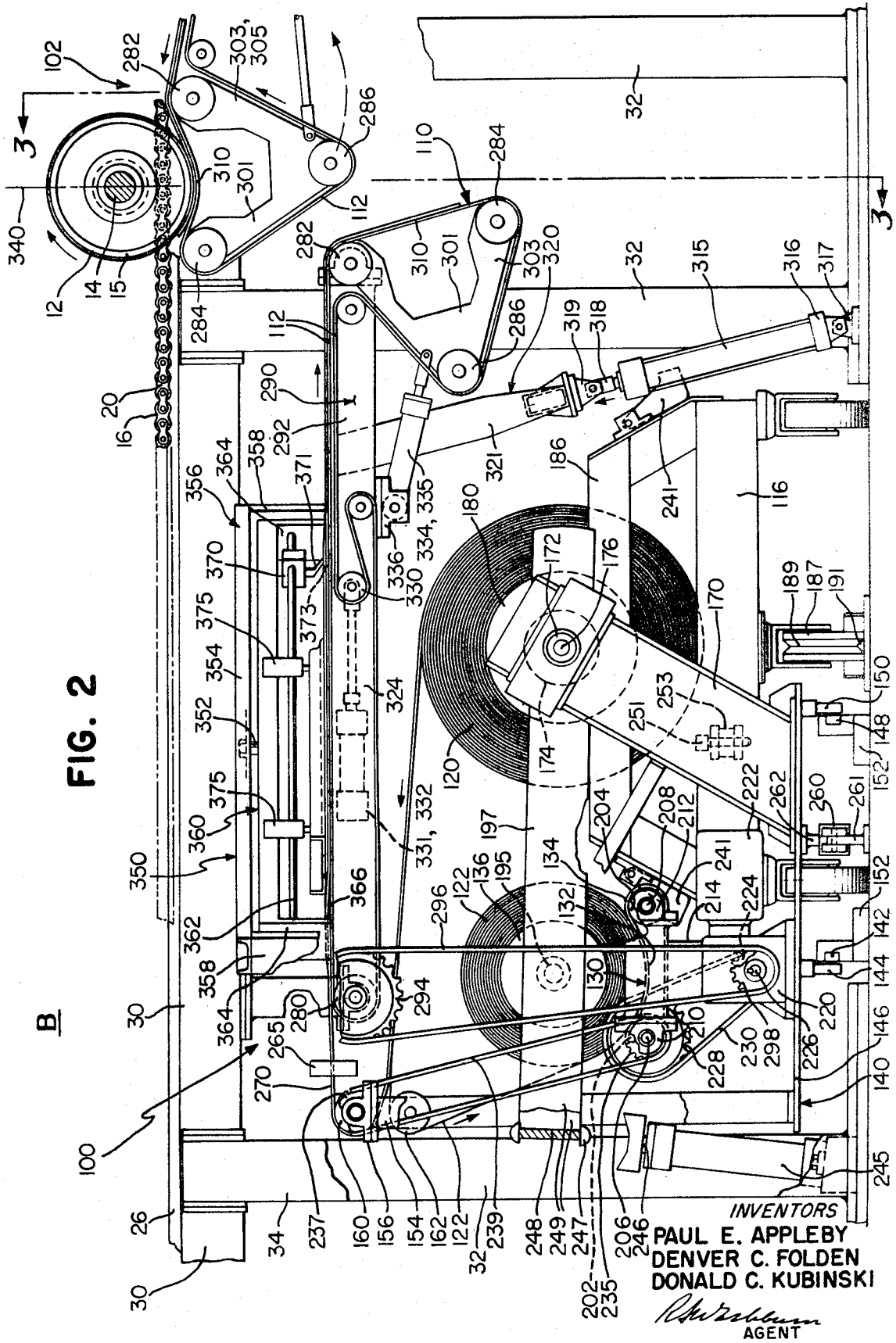

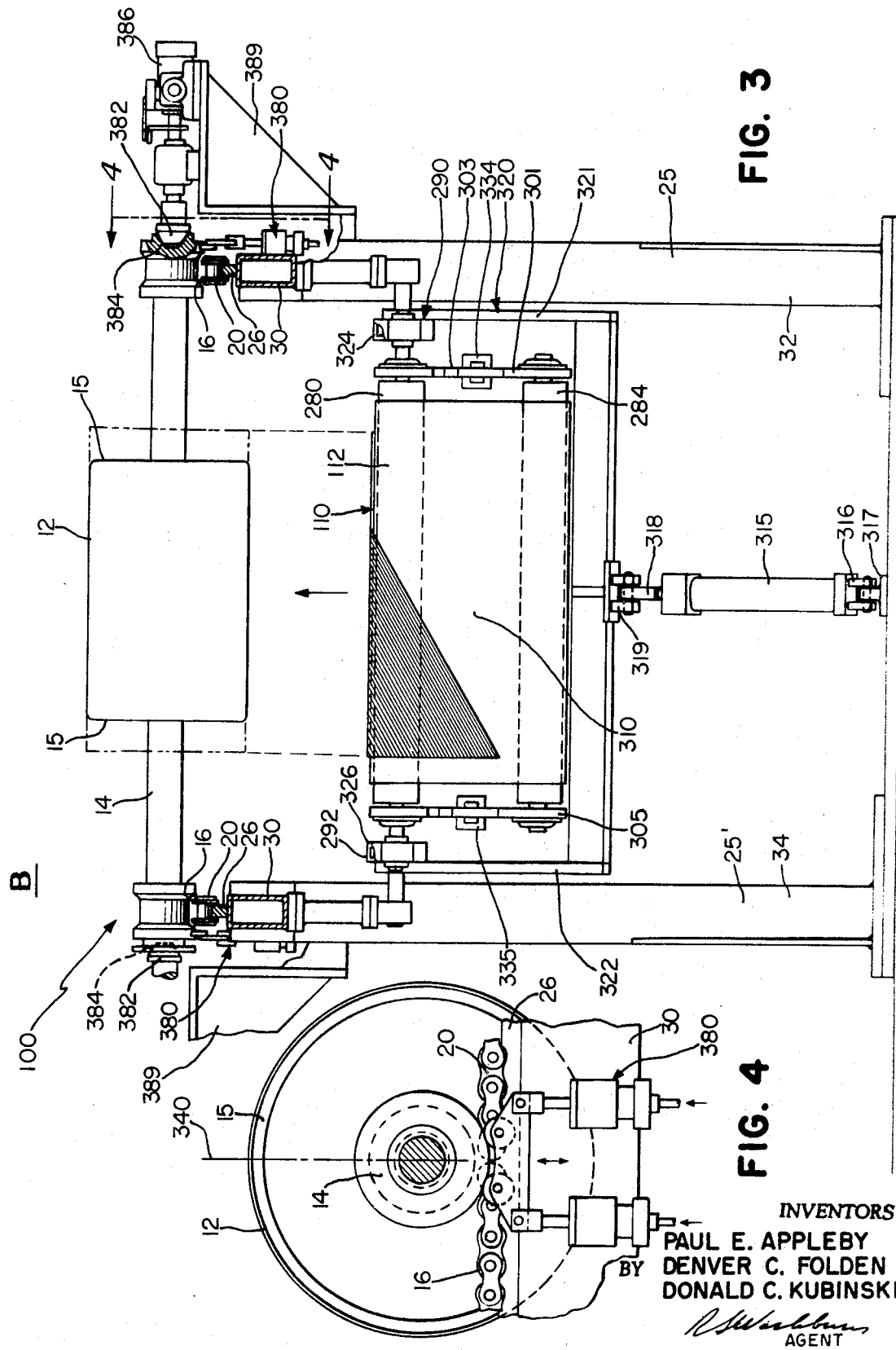

United States Patent Office 3,676,259
Patented July 11, 1972

3,676,259
TIRE BUILDING APPARATUS HAVING A PLURALITY OF COMPONENT APPLYING STATIONS AND DRUMS
Paul E. Appleby, Cuyahoga Falls, Denver C. Folden, Akron, and Donald C. Kubinski, Seville, Ohio, assignors to The Goodyear Tire & Rubber Company, Akron, Ohio
Filed July 6, 1970, Ser. No. 52,228
Int. Cl. B29h 17/20
U.S. Cl. 156—395                     15 Claims

ABSTRACT OF THE DISCLOSURE

The tire building apparatus has a plurality of building drums movable by conveyors between stations in certain of which a ply or plies is or are wound on each of successive drums. A single belt trained about rolls carried in an articulated belt conveyor frame is movable to conform a portion of the belt about an arcuate portion of the drum in such station or away from it. A supply roll of ply stock on a wheeled truck is unwound by a surface drive arrangement having belts forming a cradle which rotates a core on which a cloth liner is wound off from the supply roll to feed the ply material onto the single belt. A cut off device on the conveyor frame operates to cut a length of ply equal to the circumference of the drum plus an allowance for a suitably overlapped splice. The so cut length is wrapped by the belt onto the drum. A device for sensing the edge location of the ply is operative to move the truck and the surface drive laterally as a unit to correct deviations from the desired edge location of the moving ply.

The foregoing abstract is not to be taken as limiting the invention of this application, and in order to understand the full nature and extent of the technical disclosure of this application, reference must be made to the accompanying drawings and the following detailed description.

This invention relates to tire building apparatus having a plurality of tire component applying stations and a plurality of tire building drums movable from station to station in certain of which stations one or more turns of sheet material is or are wound on each individual drum.

A principal object of the invention is the provision of apparatus capable of applying a predetermined length of ply material in sheet form, cut from an indefinite running length supply of such material, onto the surface of each of a successive plurality of tire building drums conveyed into cooperative association with a movable belt or similar instrumentality by which the ply material is transferred to the surface of the drum without manual intervention or manipulation of the ply material.

A further object is the provision of an apparatus for manufacturing tires wherein successive layers of ply material are applied to a tire building drum by a plurality of successive similar instrumentalities each cooperatively associated with a tire component applying station in which individual drums are successively received.

Another object is to obtain a tire making apparatus in which a ply material is unwound from a supply roll thereof without significant tension or strain and without manual intervention or manipulation, cut to a predetermined length, and applied onto the tire building drum in a predetermined lateral alignment thereon.

Other objects and advantages will become apparent or will be particularly pointed out in the following illustrative description of a specific embodiment of the invention. In the drawings forming a part of the aforesaid description and referred to therein:

FIG. 2 is an enlarged view in longitudinal elevation of a portion of the apparatus of FIG. 1;

FIG. 3 is a view in transverse elevation, partially in section, oriented as indicated by the line 3—3 in FIG. 2; and FIG. 4 is a view in longitudinal elevation of a lifting device used in the apparatus of FIG. 1 and taken as indicated by the line 4—4 in FIG. 3.

Figure 1:
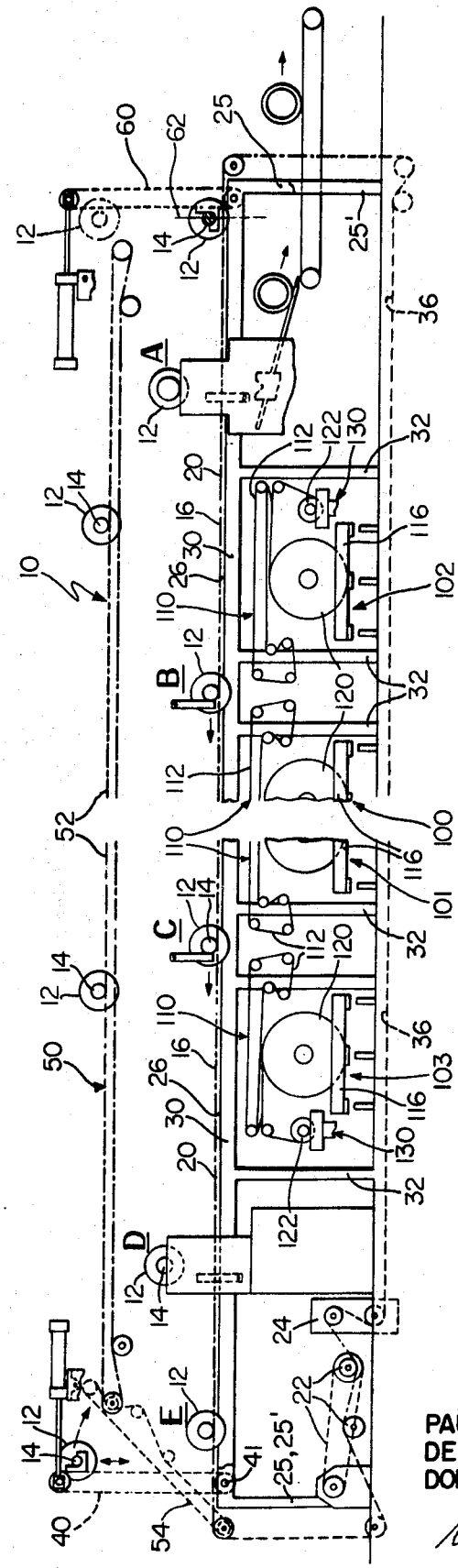
FIG. 1 is a schematic view in longitudinal elevation of an apparatus embodying the invention.

Referring to the drawings and particularly to FIG. 1; the tire building apparatus 10 includes a plurality of tire building drums 12 each of which has a coaxial center shaft 14 extending axially outwardly of the respective drum shoulders 15. The drums are supported on and transported by conveyor means having an upwardly exposed and continuously movable surface 16 provided by the conveying reach of a pair of parallel spaced apart flexible members 20 which in the apparatus 10 are specifically conventional roller chains movable continuously in closed loops by a conventional roller chain drive arrangement 22 including a slack takeup device 24. Each chain conveying reach is supported on a frame 25, 25 and guided therealong by a longitudinally extending rail 26 fixed on the top surface of a longitudinal chain beam 30 which is supported at a suitable height horizontally above the floor by a plurality of pairs of columns 32, 34 beneath which the return portions 36 of the chains 20 are moved. In FIG. 1 the near side frame 25' and the associated conveyor chain 20 are omitted to show the far side frame 25 in greater detail. It will be appreciated that the near side frame 25' is substantially identical, although opposite in hand, to the far side frame 25.

Separate and distinct operations are preformed on a tire and/or on the particular drum 12 upon which the tire is built at work stations A through E spaced longitudinally along the frame 25. At stations A, mechanism is provided for removing, from the tire building drum, a tire carcass completely assembled thereon in the apparatus 10, as will presently appear.

At the work stations B and C, which will be described presently in greater detail, tire building components in the form of sheets or strip material are successively wound onto the cylindrical surface of a tire building drum 12 while such drum is temporarily retained in the respective station. In station D, mechanism is provided for applying to the plies already wound on the drum a pair of bead reinforcing rings and for turning ply endings about the rings as is conventional in building tires. In station E, components forming the tread or the tread and sidewalls are applied to the components already assembled on the drum to complete the building of the tire carcass. The apparatus 10 may, of course, include any number of stations for applying tire building components or for manipulating the tire building drums.

Having been transported from station A to station E by the conveying chains 20, the tire building drum 12 with a completed carcass thereon is lifted by the elevating device 40, which is then swung about its pivot axis 41 to deposit the drum on an upper conveyor 50 comprising a similar pair of endless parallel spaced apart roller chains 52 driven in timed relation with the chains 20 by the drive transmission chains 54. The drum is then carried by the upper conveyor 50 to a lowering device 60 generally identical to the elevating device, and is lowered by it to the chains 20 at a location 62 upstream from station A.

Referring now to FIGS. 2 and 3; an apparatus 100 for applying a single ply component to the tire building drum 12 in station B is disposed in the space beneath the chain beams 30 and between the adjacent pair of longitudinally spaced column 32. Inasmuch as the apparatus illustrated in FIGS. 2 and 3 is in all significant respects identical to the apparatus 101 associated with station C and with the apparatus 102, 103 disposed in the respective immediately adjacent spaces, except for being erected opposite in hand, a description of the apparatus 100 will suffice to make the structure and operation of each fully apparent to persons skilled in the art.

The ply application apparatus 100 generally comprises ply conveyor 110 having a single endless belt 112, a wheeled truck 116 carrying a large supply roll 120 of appropriate ply material and a non-adherent relatively inextensible liner 122 of cloth or a suitable equivalent wound in alternating convolutions with the ply material, and a surface drive assembly 130 including a cradle 132 of drive belts 134 on which a core 136 for rewinding the liner 122 is supported.

The surface drive assembly 130 includes a sub-frame 140 movable transversely with respect to the movement direction of the surface 16 and at least generally parallel to the rotation axes of the respective tire building drums 12. To support the sub-frame 140, a pair of cam rollers 142 are rotatably secured in the brackets 144 fastened to the ell-shaped base 146 and a third cam roller 148 is fastened in the bracket 150 also secured on the base 146 to roll in and along the channels formed in the guide bars 152 fixed on the floor to extend transversely of the apparatus. The base 140 carries a pair of posts 154 extended upwardly to support a pair of pillow blocks 156 in which a stripper roll 160 is rotatably mounted. A second stripper roll 162 is rotatably mounted in suitable bearings affixed to the posts 154 and extends parallel to and immediately below the first stripper roll 160 and parallel to the respective tire building drum axes. A post 170 secured to the base 146 has a splined sleeve 172 mounted for rotation coaxially of the supply roll 120 in suitable bearings fixed on the post 170. A brake 174 mounted on the post is operative to apply a retarding torque to the splined sleeve 172 into which the shaft 176 of the supply roll core 180 is telescopically and corotatably entered. The core shaft 176 is rotatably mounted in suitable bearings affixed to the main structure 186 of the four-wheeled truck 116, two wheels 187 of which are provided with peripheral grooves 189, conjugate with a guide track 191 of inverted V-section which is fixed to the floor to extend parallel to the respective drum axes so that the truck 116 can be trundled into and out of the tire building apparatus 10, and cooperative relation with the ply application apparatus 100.

In addition to the supply roll 120, the truck 116 carries the liner roll core 136 having a core shaft 195 rotatably mounted in bearings fixed respectively in a pair of arms 197 which are pivotally mounted to swing between a vertical position, in which the liner core 136 is disposed vertically above the supply roll core 180, and the down position, as illustrated in FIG. 2, wherein the liner core 136 is supported on the cradle 132 by the upper surfaces of a plurality of endless belts 134 capable of driving the liner cloth winding on the core 136 at a constant surface speed irrespective of the number of convolutions of liner cloth wrapped about the core.

The endless belts 134 are supported and driven by pulleys 202, 204 mounted in respectively coplanar pairs on a pair of parallel pulley shafts 206, 208 supported for rotation in the pillow blocks 210, 212 secured on the T-pedestal 214 which are affixed to the base 146 vertically above the brackets 144.

To provide for rotation of the belts 134 forming the cradle 132 and the liner receiving core 136, a conventional gear reducer 220, driven by the motor 222, has a sprocket 224 mounted on its output shaft 226 and connected to a sprocket 228 corotatable with the pulley shaft 206 by a conventional drive chain 230. A driving sprocket 235 on the pulley shaft 206 is connected to a driven sprocket 237 corotatable with the first stripper roll 160 by a loop 239 of conventional roller chain. The surface speeds of the belts 134 and the roll 160 are thus maintained at least nominally equal by the drive arrangement described.

Two pairs of swing supports 241 mounted on the truck 116 are engageable with the respective arms 197 to support them in an intermediate or partially down position facilitating movement of the truck 116 into and out of the apparatus 100. To lift the arms 197 and/or to lower them while the truck 116 is in its cooperative position, as seen in FIG. 2, a lift cylinder 245 having a rod end 246 engageable with the fixture 247 mounted on a bar 248 connecting the free ends 249 of the arms 197 enables an operator readily to raise or lower the arms and the liner receiving core carried by the arms so as to place the swing supports 241 into supporting relation with the arms before removing the truck, or swing the same downwardly, as shown, to lower the core 136 onto the cradle 132.

Lock means of any suitable type, such as the pin 251 and socket 253 are employed to secure the sub-frame 146 and the truck 116 together for reciprocatory or oscillatory movement laterally as a unit relative to the drum. Such movement of the sub-frame 140 together with the cradle 132 and the truck 116 is obtained by the hydraulically operated cylinder 260 connected between the floor bracket 261 and the sub-frame bracket 262. A sensing device 265 of a type per se known is mounted on the frame 25 to supervise the edge of the ply material. Any deviation of the lateral position of the material as it moves across the span 270 between the roll 160 and the belt 112 causes the sensing device 265 to produce a signal which is amplified by a fluid pressure control unit (not shown) of the well known "Askania" type, the outputs of which are communicated to the respective sides of the piston in the cylinder 260 to move the sub-frame 140 in a direction to reduce the deviation of the material edge from its preferred lateral position.

As will be apparent from FIG. 2, the leading end of the ply stock or material to be unwound from the supply roll 120 is trained therefrom and between the upper and lower stripper rolls 160, 162 together with the interwound liner cloth conventionally used in such supply rolls. The ply material alone is trained around the roll 160 while the liner cloth 122 is trained around the lower roll 162 and thence downwardly into the nip formed between the cradle 132 and the liner receiving core 136. As the surface driving belts 134 are rotated, the liner cloth is wound upon the liner receiving core 136 at a constant surface speed to unwind the ply material from the supply roll 120 and so deliver the ply material without strain or tension therein to the roll 160 which is itself driven at the same surface speed as the belts 134.

To convey the ply material as well as to apply it to the drums 12, the belt 112 forms an endless loop trained about the belt drive roll 280, and about a plurality of idler rolls 282, 284, 286 rotatably mounted in suitable bearings fixed on an articulated frame 290 having two parts. The first part 292 is mounted swingably about the axis of the belt drive roll 280, the shaft of which is provided with a driven sprocket 294 connected by a roller chain 296 with a driving sprocket 298 on the output shaft of the gear reducer 220 to drive the endless belt 112 at a surface speed effectively equal to the speed of the belts 134 forming the cradle. The second part 301 of the conveyor frame 290 includes a pair of side members 303, 305 mounted pivotally about the axis of the idler roll 282 and carrying the idler rolls 284, 286.

Between the idler rolls 282 and 284, the belt travels an open span 310. By appropriate regulation of the tension in the belt 112, the span 310 is readily made to conform to an arcuate portion of the building drum 12 over an arc length of about 30° to 75°. The angle of wrap of the span 310 on the drum 12 can be adjusted to obtain most effective transfer of ply material from the belt 112 onto the drum 12 or onto a ply component already wrapped thereon.

The first part 292 of the ply conveyor 110 is swung about the roll 280 by a cylinder operator 315, the head end 316 of which is pivotally mounted in a bracket 317 secured to the floor. The rod end 318 of the operator 315 is pivotally connected to a clevis 319 forming a part of the yoke 320, the two arms 321, 322 of which are rigidly connected respectively to the side members 324, 326.

A suitable tension in the endless loop of the belt 112 is maintained by a conventional takeup roll 330 mounted in takeup bearings slidable longitudinally of the frame 290 and connected respectively to the air cylinders 331, 332, provided with pressure regulated air supply and fixed on the conveyor frame members 324, 326. The second part 301 of the conveyor 110 is extendable relative to the first part 292 by rotation of 301 about the roll 282 in an anti-clockwise direction as seen in FIG. 2, for which purpose two air cylinders 334, 335 each connected at its head end to a suitable bracket 336 mounted on the respective members 324, 326 and at its rod end respectively connected to the second conveyor part 301. The cylinders are connected through conventional pressure regulators to a suitable air supply.

As will be evident from inspection of FIG. 2, the ply application apparatus 102 in the immediately adjacent space, which is likewise associated with the tire building drum in station B, is retractable by cylinders identical to the cylinders 315 and 334, 335, enabling the full extension and the upward movement of the ply conveyor 110 to place the span 310 of the belt 112 into arcuate wrapping relation with the tire building drum 12, as is indicated by the position of the apparatus 102, or retracted by the operation of the cylinders 315 and 334, 335, to the position of the apparatus 100 shown in which the second parts 301 of the conveyor 110 is moved inwardly beneath the first part 292 and spaced away from the vertical plane 340 containing the drum axis.

In order to sever a predetermined length of ply material from the running length thereof delivered from the supply roll 120 over the stripping roll 160 and onto the belt 112, a cutoff mechanism 350 is pivotally carried on a stud 352 fixed in the horizontal member 354 of a bridge 356, the respective ends 358 of which are secured to the near and far side members 324, 326 of the first part 292 of the ply conveyor 110. Suspended on the stud 352 is an open rectangular frame 360 having an upper guide beam 362 adjustably fixed angularly with respect to the direction of travel of the belt 112. At the respective ends of the guide beam the downwardly depending struts 364 are connected to support a knife guard strip 366 disposed closely parallel to the belt 112. A knife carriage 370 movable along the guide beam 362 has a knife 371 which is yieldably mounted on the carriage to permit the knife to follow a cutting line parallel to and between cords of the ply material. The tip of the knife is restrained from excessive lateral movement by the walls of a narrow groove 373 extending lengthwise in the upper surface of the guard strip 366. The ply material is held in firm contact with the surface of the belt 112, as the knife cuts the material, by a plurality of holding plungers 375 mounted on each side of the upper guide beam 362, which are retracted upon completion of the knife travel.

Making reference to FIGS. 3 and 4; the tire building drum 12 is transported by the continuously moving conveyor surfaces 16 into alignment with the lifting device 380 and thereby elevated sufficiently to locate its rotation axis coaxially with the chucking spindles 382 which are thereupon extended into engagement with the seats 384 in the respective ends of the center shaft 14 by the air cylinders 386 fixed rigidly on the brackets secured on the chain beams 30. The drum 12 is held by the spindles 382 and is freely rotatable about its own axis, allowing the drum to be rotated by the belt 112 and the ply material thereon.

The operation of the ply application apparatus 100 will have become generally apparent from the preceding description. It will be appreciated by persons skilled in the art that the apparatus 100 can readily be employed to apply any single ply material to each of a succession of tire building drums in the apparatus 10. For example, by minor and relatively evident adjustments, the apparatus 100 can be employed to apply to a tire building drum 12, one or more circumferential wraps of a carcass liner, or alternatively, a first or a second ply of cord reinforcing carcass stock, the axial ends of which will extend outwardly of the drum shoulders 15, or again alternatively, a breaker or like ply of cord reinforcing material of a width generally approximating the width of the tread portion of such tire.

In beginning operation of the ply application apparatus 100, a supply truck 116 having a supply of appropriate tire component material wound together with alternating convolutions of an inextensible liner cloth or the like is brought to the vicinity of the apparatus with a linear core 136 supported vertically above the supply roll 120 by the arms 197.

It is noted that the truck 116 and the supply thereon are symmetrical with respect to a plane containing the centerline of the running length of ply material. It will also be observed that the supply roll 120 may be unwound either clockwise or anti-clockwise, the latter being illustrated in FIG. 2, so that either the inside or the outside of the ply material as wound upon the supply roll 120 may be faced toward the drum 12 to be wound thereon, and that the truck 116 and supply roll 120 may be entered into the apparatus either end foremost so that the bias angle of the cords of a reinforcing fabric will be delivered to form either a righthand or a lefthand helix about the tire building drum as will be required by the tire specifications at any particular station in the building apparatus.

The appropriate pair of swing supports 241 are placed in their upward position, manually, and the liner core 136 and arms 197 are lowered manually to rest thereon so that the liner core is maintained in a clear position for movement into the apparatus without interference with the cradle. The truck 116 is thereupon trundled into the apparatus 100 with the grooved wheels 187 in engagement with the track 191, moving toward the viewer as seen in FIG. 2. The driving end of the supply roll shaft 176 moves into the spline 172. The truck is then locked in place relative to the surface drive assembly 130 for movement as a unit therewith as has been described.

With the truck and supply roll in place, the leading end of the liner cloth is passed between the stripper rolls 160, 162 and two or three turns thereof are wound manually about the liner receiving core 136 which is then lifted to permit the supports 241 to be rotated down to the position shown in FIG. 2, and the liner core 136 is lowered into surface engagement with the cradle 132. The drive motor 222 is then temporarily energized to rotate the liner core thereby unwinding the liner from the supply roll 120 to bring a leading end of the ply material to the upper stripper roll 160 where the material can be turned about the roll 160 and extended across the open span 270 into contact with the surface of the ply conveyor belt 112.

With the leading end of the ply material lightly adhered to the belt 112, the drive motor is again operated to wind the liner and move a leading edge of the ply material toward the cutoff mechanism 350. The ply material is laid over the guard strip 366 to extend forwardly thereof, a small distance and the cutoff knife 371 is actuated to cut a fresh leading edge of the ply, thereby establishing a fixed relation between the new leading edge of the ply and the position of the belt 112. The short piece cut off from the new leading edge can be discarded.

With a tire building drum 12 chucked in the respectively associated station, B, the ply application apparatus 100 is ready to apply a predetermined length of the material to the drum. The surface drive 130 is energized to advance the belt 112 carrying the ply an amount or distance exactly equal to the predetermined length of ply material required, which in the usual application is equal to the circumference of the drum itself or to the circumference of the previously applied components thereon, plus an overlap to provide a suitable splice. The drive motor 222 is then stopped to position the trailing edge of the predetermined length precisely with respect to the cutoff knife 371 which is thereupon again actuated to sever, from the running length of material, the required length of ply for the particular tire. While the knife 371 is being traversed across the ply material at the cutoff angle as determined by the bias angle of the cords in the ply, the plungers 375 are urged into contact with the ply material to prevent displacement thereof relatively of the belt 112 by the knife 371. The plungers are then retracted and the motor 222 started while simultaneously the respective cylinders 315 and 334, 335 elevate the first part 292 of the articulated conveyor frame as well as extend the second part 301 thereof upwardly to place the belt span 310 into a partial wrapping relation with the building drum 12. Movement of the belt 112 effects rotation of the freely rotatable drum 12 and transfers the predetermined length of the ply material by preferential adhesion onto the drum from the belt. The belt 112 is continued in its driving movement to rotate the drum 12 so that a splice is made between the forward and trailing ends of the ply.

The belt 112 is then stopped and the respective parts 292, 301 of the articulated conveyor frame 290 are lowered and retracted to move the ply conveyor 110 downwardly, out of the path of the drum as the same travels with the drum conveyor members 20, and retracting the second part 301 away from a vertical plane 340 containing the drum axis so that the ply application apparatus 101 situated in the next space and associated with the station B, is operative to apply a next succeeding ply to the drum in a manner substantially identical to the application of the ply as has just been described.

During forward movement of the ply material across the span 270 between the stripping roll 160 and the belt 112, the sensing device 265 supervising the edge position of the material produces a continuous signal proportional to the displacement or lateral deviation of the actual edge of the ply from a predetermined preferred edge position thereof. The signal is communicated to an Askania device (not shown) by which hydraulic pressure is directed to one or the other ends of the cylinder 260 to cause the same to move the surface drive assembly 130 in a direction opposite to the direction of deviation which is sensed by the device 265. As has been previously pointed out, the entire assembly including the truck 116 attached thereto and the stripping rolls 160, 162 as well as the surface driving cradle 132 are moved as a unit laterally of the building apparatus 10.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for building tires comprising a plurality of tire component applying stations, a plurality of tire building drums movable from station to station therein, conveyor means for supporting and moving said drums between said stations, and ply application means having belt means movable in a single direction in a single closed circuit and being movable to conform said belt means with an arcuate portion of one of said drums or a tire component wrapped thereon and to move said belt means away from said one of said drums, including cutoff means mounted on said ply application means and operable to sever a predetermined length of ply material from an indefinite running length of such material being carried on said belt means.

2. Apparatus as claimed in claim 1, wherein said conveyor means comprises a pair of parallel spaced apart members each providing a continuous upwardly exposed surface movable in synchronism with the other of said pair.

3. Apparatus as claimed in claim 2, wherein at least certain of said stations include chucking means operable to receive and to support a drum for rotation about a fixed axis associated with said ply application means.

4. Apparatus as claimed in claim 3, wherein said parallel members comprise a pair of flexible endless continuously movable elements for supporting and moving said drums between said stations.

5. Apparatus as claimed in claim 3, including a pair of lifting devices associated with each said ply application means and operable to disengage a drum from said drum conveying means.

6. Apparatus as claimed in claim 2, each of said plurality of tire building drums including a central coaxial shaft extending outwardly axially of respective shoulders of said drum, and means mounted respectively on the ends of said shaft and engageable with said parallel spaced members for movement of the drum by and with said members.

7. Apparatus as claimed in claim 2, said belt means comprising a single endless looped flat belt for receiving ply material from a running length supply thereof and for conveying a predetermined length of said stock into circumferentially wrapping relation with a respectively associated drum.

8. Apparatus as claimed in claim 2, said ply application means including an articulated frame having a first part mounted swingably about a pivot axis fixed parallel to the rotation axes of said drums and a second part mounted swingably about an axis fixed in said first part parallel to said pivot axis.

9. Apparatus as claimed in claim 8, said ply application means including a driving roll in driving engagement with said belt means, a plurality of idler rolls supporting said belt means, said first part of said ply application means being mounted swingably about the axis of said driving roll, and said second part thereof being mounted swingably about the axis of one of said idler rolls, said parts cooperating to train said belt means arcuately about said one drum and to retract the same away from said one drum.

10. Apparatus as claimed in claim 8, said second part being selectively extendable and retractable relative to said first part to a position at least partially beneath said first part and spaced away from a vertical plane containing the rotational axis of said one drum.

11. Apparatus as claimed in claim 2, comprising stock supply means including a wheeled truck secured releasably in the apparatus for moving a roll of ply material into the apparatus.

12. Apparatus as claimed in claim 11, further comprising surface drive means effective to unwind said material from said roll thereof onto said ply application means.

13. Apparatus as claimed in claim 12, a pair of arms swingably secured to said truck for movement about the rotation axis of said supply roll, a liner wind-up core fixed rotatably in the respective arms, the arms being movable to engage an arcuate surface portion of liner cloth wound upon said wind-up core with said surface drive means, and means effective to move said truck and said surface drive means as a unit laterally of said drum conveying means.

14. Apparatus as claimed in claim 13, said surface drive means comprising at least one endless drive member forming a resilient cradle for supporting and driving engagement with an arcuate surface of a liner cloth wound on said liner core, a pair of parallel spaced apart rotatable shafts each having pulley means engageable with the inward surface of the loop of said endless member for supporting and driving said member.

15. Apparatus as claimed in claim 14, additionally comprising an oscillatable frame carrying said surface drive means and having a plurality of wheels engaged respectively with channel guides disposed parallel to the respective rotation axes of said drums, means locking said frame and said truck for conjoint movement, a pair of stripper rolls rotatably mounted on said frame parallel to said drum axes to strip said ply material from said liner cloth, and a ply material edge sensing unit responsive to the lateral edge position of said ply material relative to a predetermined line, and driving means connected to said oscillating frame to move said frame in response to deviation of said edge relative to said line detected by said edge sensing unit in a direction to reduce said deviation.

References Cited

UNITED STATES PATENTS 3,157,542  11/1964  Trevaskis _____ 156—196 UX
3,057,397  10/1962  Riddle et al. _____ 156—405

STEPHEN C. BENTLEY, Primary Examiner

U.S. Cl. X.R.

156—396, 405